US012165786B2

(12) United States Patent
Gustavsson et al.

(10) Patent No.: US 12,165,786 B2
(45) Date of Patent: Dec. 10, 2024

(54) AIR-COOLED AIR-TO-AIR BUSHING

(71) Applicant: Hitachi Energy Ltd, Zürich (CH)

(72) Inventors: Dan Gustavsson, Ludvika (SE); Simon Lindgren, Borlänge (SE); Jan Kogner, Västerljung (SE); Richard Natz, Borlänge (SE); Zoltan Repasi, Västerås (SE); Thomas Eriksson, Ludvika (SE)

(73) Assignee: HITACHI ENERGY LTD, Zürich (CH)

( * ) Notice: Subject to any disclaimer, the term of this patent is extended or adjusted under 35 U.S.C. 154(b) by 237 days.

(21) Appl. No.: 17/793,062

(22) PCT Filed: Jan. 15, 2021

(86) PCT No.: PCT/EP2021/050786

§ 371 (c)(1),
(2) Date: Jul. 15, 2022

(87) PCT Pub. No.: WO2021/144409

PCT Pub. Date: Jul. 22, 2021

(65) Prior Publication Data

US 2023/0045369 A1 Feb. 9, 2023

(30) Foreign Application Priority Data

Jan. 15, 2020 (EP) .................................... 20152003

(51) Int. Cl.
*H01B 17/54* (2006.01)
*H01B 17/26* (2006.01)

(52) U.S. Cl.
CPC ............ *H01B 17/54* (2013.01); *H01B 17/26* (2013.01)

(58) Field of Classification Search
CPC .. H02G 3/22; H02G 3/24; H02G 3/26; H02G 3/30; H02G 3/36; H02G 15/007;
(Continued)

(56) References Cited

U.S. PATENT DOCUMENTS 1,706,810 A 3/1929 Paul
3,564,108 A 2/1971 Schmitz
(Continued)

FOREIGN PATENT DOCUMENTS

CN 101465523 A 6/2009
CN 103026564 A 4/2013
(Continued)

OTHER PUBLICATIONS

First Office Action for Chinese Patent Application No. 2021800082739, mailed Apr. 29, 2023, 7 pages.
(Continued)

*Primary Examiner* — Angel R Estrada
(74) *Attorney, Agent, or Firm* — Sage Patent Group

(57) ABSTRACT

The present disclosure relates to an air-to-air through-wall bushing including a conductor, insulation surrounding the conductor, a ventilation inlet at a first end of the bushing, and a ventilation outlet at a second end of the bushing. The bushing is arranged through a wall and a pressure difference between a first pressure on a first side of the wall and a second pressure on a second side of the wall is provided The inlet and outlet allow cooling air to pass through a ventilation channel within the bushing driven by the provided pressure difference.

20 Claims, 1 Drawing Sheet

(58) Field of Classification Search
CPC ........ H02G 15/04; H02G 3/083; H02B 1/305; F16L 5/10; F16L 5/14; B60R 16/0222; B60R 16/0215; H01B 17/54; H01B 17/26; H01B 17/30
USPC ........ 174/650, 656, 153, 135, 152 G, 153 G, 174/152 R, 659, 664, 137, 155, 156, 15.3, 174/14 BH, 11 BH, 15.1, 18; 248/74.1, 248/74.2, 68.1, 65, 49, 56, 74.3; 16/2.1, 16/2.2
See application file for complete search history.

(56) References Cited

U.S. PATENT DOCUMENTS

| | | | | | |
|---|---|---|---|---|---|
| 3,626,079 | A * | 12/1971 | Keen, Jr. | H01B 17/54 | 174/18 |
| 4,169,965 | A * | 10/1979 | Cronin | H01B 17/26 | 174/31 R |
| 4,454,381 | A * | 6/1984 | Ito | H02G 3/088 | 174/650 |
| 5,256,834 | A * | 10/1993 | Gehring | H02G 3/288 | 174/650 |
| 2010/0243288 | A1 | 9/2010 | Eriksson | | |
| 2013/0100587 | A1 | 4/2013 | Yoshida et al. | | |

FOREIGN PATENT DOCUMENTS

| | | | | |
|---|---|---|---|---|
| CN | 105119214 | A | 12/2015 | |
| CN | 204905804 | U | 12/2015 | |
| CN | 204927997 | U | 12/2015 | |
| DE | 102011001985 | A1 * | 10/2012 | H02G 3/083 |
| EP | 2267870 | A1 | 12/2010 | |
| JP | S48-93400 | A | 12/1973 | |
| JP | 650-114596 | A | 9/1975 | |
| JP | S52170299 | U | 12/1977 | |
| JP | S62-160076 | A | 7/1987 | |
| KR | 20130056385 | A | 5/2013 | |

OTHER PUBLICATIONS

Notice of Reasons for Refusal for Japanese Patent Application No. 2022-543148, mailed Sep. 26, 2023, 8 pages.
European Office Action dated Oct. 10, 2022 for European Patent Application No. 20152003.8, 9 pages.
International Search Report and Written Opinion of the International Searching Authority, PCT/EP2021/050786, mailed Mar. 26, 2021, 15 pages.
Extended European Search Report dated Jul. 20, 2020, for European Patent Application No. 20152003.8, 10 pages.

* cited by examiner

AIR-COOLED AIR-TO-AIR BUSHING

CROSS REFERENCE TO RELATED APPLICATIONS

This application is a 35 U.S.C. § 371 national stage application of PCT International Application No. PCT/EP2021/050786 filed on Jan. 7, 2021, which in turn claims foreign priority to European Patent Application No. 20152003.8, filed on Jan. 15, 2020, the disclosures and content of which are incorporated by reference herein in their entirety.

TECHNICAL FIELD

The present disclosure relates to an air-to-air through-wall bushing.

BACKGROUND

Wall bushings in operation today are normally cooled with natural convection from the surrounding air. One of the demands for a bushing is a certain current level, and this might be hard to fulfil with only air cooling when the bushing is close to the current limit.

SUMMARY

It is an objective of the present disclosure to provide an improved cooling of an air-to-air through-wall electrical bushing, typically a high-voltage (HV) bushing, e.g. arranged through a wall of a valve hall.

According to an aspect of the present disclosure, there is provided an air-to-air through-wall bushing comprising a conductor, insulation surrounding the conductor, a ventilation inlet at a first end of the bushing, and a ventilation outlet at a second end of the bushing. The inlet and outlet allow cooling air to pass through a ventilation channel within the bushing.

According to another aspect of the present disclosure, there is provided a hall arrangement comprising an embodiment of a bushing of the present disclosure arranged through a wall of a hall of the hall arrangement.

According to another aspect of the present disclosure, there is provided a method of providing an air flow through a ventilation channel within an air-to-air through-wall bushing. The bushing is arranged through a wall. The bushing comprises a conductor, insulation surrounding the conductor; a ventilation inlet at a first end of the bushing and a ventilation outlet at a second end of the bushing. The method comprises providing a pressure difference between a first pressure on a first side of the wall and a second pressure on a second side of the wall, and allowing ambient air to pass through the ventilation channel within the bushing, from the ventilation inlet to the ventilation outlet, forming an airflow through the ventilation channel driven by the provided pressure difference.

By means of the ventilation channel with openings (inlet and outlet, respectively) in both ends of the bushing, cooling air may flow through the channel to cool the bushing driven by a pressure difference across the bushing, without the need for forced air circulation by e.g. a fan or compressor or the like. Since the bushing is configured for being arranged through a wall, there may be a difference in pressure between the different sides of said wall. There may e.g. be a slight intentional overpressure in the inside of a building to prevent dust and other contaminants from entering the building. By means of the bushing having a ventilation channel with openings in both ends of the bushing, such a pressure difference may drive a cooling air flow through the ventilation channel.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
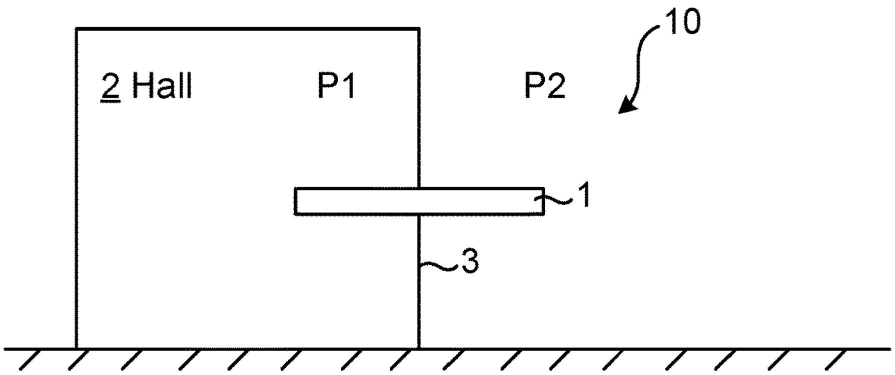
FIG. 1 is a schematic sectional side view of a valve hall having a bushing arranged through a wall thereof, in accordance with some embodiments of the present disclosure.

FIG. 1 illustrates an embodiment of a hall arrangement 10 comprising an air-to-air through-wall bushing 1 arranged through a wall 3. That the bushing is an air-to-air bushing implies that both ends of the bushing are configured to be arranged in ambient air, the inlet and outlet of the ventilation channel opening to said ambient air, not e.g. immersed in an insulation fluid such as e.g. transformer oil or $SF_6$ gas. That the bushing is a through-wall bushing implies that it is configured to be mounted through a wall, e.g. of a valve hall. The wall may be of a hall 2 comprised in the hall arrangement 10, e.g. a valve hall, such as a valve hall, housing e.g. a power converter. The bushing 1 may be arranged for either or both of a Direct Current (DC) and an Alternating Current (AC). The bushing 1 may be a HV bushing, i.e. be arranged to pass/connect a HV current through the wall 3. Thus, the bushing 1 passes from air within the hall 2 to air outside of the hall. There is a pressure difference between the air within the hall and the air outside of the hall. There may thus be either an overpressure or an underpressure in the hall. Typically, there is intentionally maintained an overpressure in the hall 2 to prevent dust from entering the hall and pollute the possibly sensitive equipment therein. As illustrated in the figure, there is a first pressure P1 within the hall 2, and a second pressure P2 outside of the hall. If there is an overpressure in the hall, then P1>P2. The bushing may connect to electrical equipment outside of the hall (not shown), e.g. a power transformer.

Figure 2:
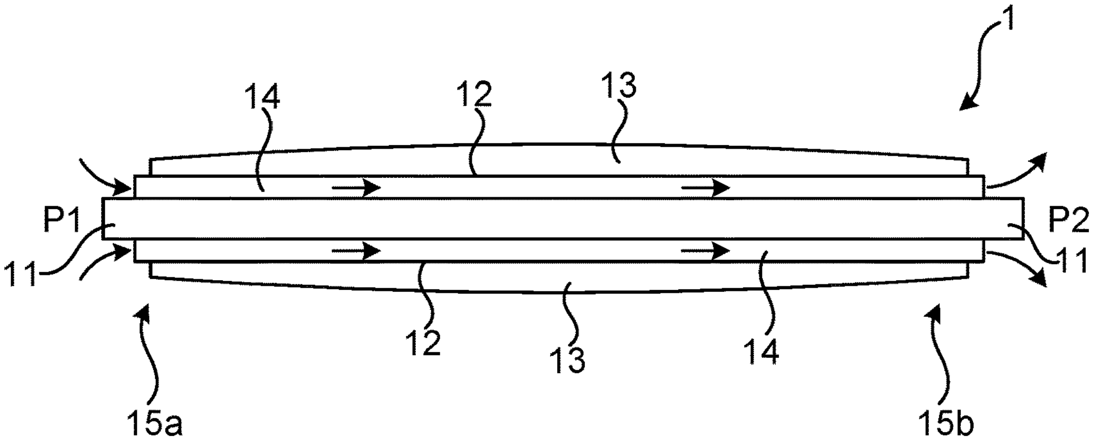
FIG. 2 is a schematic view in longitudinal section of a bushing, in accordance with some embodiments of the present disclosure.

FIG. 2 illustrates a bushing 1 comprising an electrical conductor 11. The conductor is typically centrally arranged in the bushing, along a central longitudinal axis of the bushing. The conductor may be tubular (hollow) or massive, preferably tubular in the form of a conductor tube 11. The conductor is surrounded, typically concentrically, by electrically insulating insulation comprising a condenser core 13. The insulation may also comprise an outer shell or shed (not shown), typically comprising shed tips for preventing creepage along the outside of the bushing. At each end 15, here a first end 15*a* and a second end 15*b*, of the bushing, the conductor is arranged to electrically connect to electrical equipment, e.g. power converter and/or transformer as mentioned above. Typically, the first end 15*a* is an inner end configured to be arranged inside of the hall 2, and the second end 15*b* is an outer end configured to be arranged outside of the hall 2.

The condenser core 13 may be wound directly onto the conductor 11. However, often it is preferred to wind the condenser core 13 onto a winding tube 12, e.g. to allow the conductor 11 to be removed. In accordance with the present disclosure, cooling air is allowed to flow, e.g. as indicated by the arrows in the figure, through a ventilation channel 14 within the bushing 1, typically longitudinally along the bushing, preferably in contact with the conductor 11, to remove heat from the conductor and from the bushing as a whole. If P1>P2, as in the example of FIG. 2, the air will flow from the first end 15*a* of the bushing to the second end 15*b*, without the need for a fan, compressor or other means for forcing a flow of the cooling air. The ventilation channel 14 may be formed inside and/or outside of the conductor 11. Typically, the winding tube 12 is arranged concentrically around the conductor 11, e.g. such that a, typically concentric, air-gap is formed between the conductor and the winding tube. It that case, the ventilation channel 14, e.g. also substantially concentric, may be formed within said air-gap outside of the conductor. However, if the conductor 11 is hollow, e.g. in the form of a conductor tube, the ventilation channel 14 may additionally or alternatively be formed within the conductor.

Figure 3:
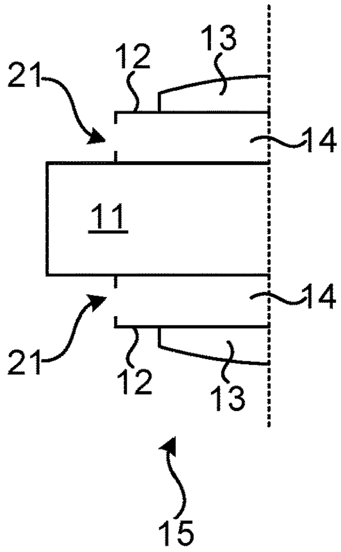
FIG. 3 is a schematic view in longitudinal section of an end of the bushing of FIG. 2, in accordance with some embodiments of the present disclosure.

FIG. 3 illustrates an end 15 of the bushing 1, e.g. either of the first and second ends 15*a* and 15*b* of FIG. 2. In the embodiment of the figure, ventilation hole(s) or opening(s) 21 are arranged to allow air to pass between the outside of the bushing 1 and a ventilation channel 14 within the bushing. The ventilation hole(s) 21 may either form a ventilation inlet, allowing cooling air from outside of the bushing to enter the ventilation channel 14, if the end 15 is arranged at an overpressure, or a ventilation outlet, allowing cooling air to exit the ventilation channel 14 into the outside of the bushing, if the end 15 is arranged at an underpressure.

In the embodiment of FIG. 3, the ventilation channel 14 is formed outside of the conductor 11, between the conductor and the winding tube 12. Thus, the ventilation hole(s) 21 are formed in the winding tube, e.g. through a wall of the winding tube, or in/through a flange or other end connection between the winding tube and the conductor as illustrated in the figure. However, if all or a part of the ventilation channel 14 is formed within the conductor 11, ventilation hole(s) 21 are formed in the conductor tube, e.g. through a wall of the conductor tube, or in an end arrangement of the conductor tube to allow cooling air to enter or exit the conductor tube.

In some embodiments of the present disclosure, the ventilation channel 14 is formed outside of the conductor 11. In some embodiments, the ventilation channel 14 is formed in an air-gap between the conductor 11 and a winding tube 12 of the bushing 1. In some embodiments, the winding tube 12 is concentrically arranged outside of the conductor 11. In some embodiments, the ventilation inlet 21 and the ventilation outlet 21 are provided through a respective end connection between the winding tube 12 and the conductor 11 at each end 15*a* and 15*b* of the bushing.

In some embodiments of the present disclosure, the conductor 11 is in the form of a hollow conductor tube. In some embodiments, additionally or as an alternative to a ventilation channel 14 formed outside of the conductor 11, the ventilation channel is formed inside of the conductor tube 11. In some embodiments, the ventilation inlet 21 and the ventilation outlet 21 are provided through a wall of the conductor tube 11, thus facilitating the ventilation channel being formed within the conductor tube.

In some embodiments of the present disclosure, the bushing 1 is arranged through a wall 3, e.g. of a valve hall 2.

In some embodiments of the present disclosure, the bushing 1 is comprised in a hall arrangement 10 in which the bushing 1 is arranged through a wall 3 of a hall 2 of the hall arrangement 10. In some embodiments, the hall (2) is a valve hall, e.g. housing a power converter, e.g. a Modular Multilevel Converter (MMC). In some embodiments, the hall 2 holds an overpressure P1 which can press cooling air to flow through the ventilation channel 14 from the ventilation inlet 21 arranged within the hall to the ventilation outlet 21 arranged outside of the hall.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. An air-to-air through-wall bushing comprising:
a conductor;
insulation surrounding the conductor;
a ventilation inlet at a first end of the bushing;
a ventilation outlet at a second end of the bushing; and
a ventilation channel extending between the ventilation inlet and the ventilation outlet;
the bushing arranged through a wall,
a pressure difference between a first pressure on a first side of the wall and a second pressure on a second side of the wall being provided, and
said ventilation channel configured to allow cooling air to pass into the ventilation inlet, through a ventilation channel within the bushing, and out of the ventilation outlet, driven by the provided pressure difference.

2. The bushing of claim 1, wherein the ventilation channel is formed outside of the conductor.

3. The bushing of claim 2, wherein the ventilation channel is formed in an air-gap between the conductor and a winding tube of the bushing.

4. The bushing of claim 3, wherein the winding tube is concentrically arranged outside of the conductor.

5. The bushing of claim 3, wherein the ventilation inlet and the ventilation outlet are provided through a respective end connection between the winding tube and the conductor at each end of the bushing.

6. The bushing of claim 1, wherein the conductor is in the form of a hollow conductor tube.

7. The bushing of claim 6, wherein the ventilation channel is formed inside of the conductor tube.

8. The bushing of claim 7, wherein the ventilation inlet and the ventilation outlet are provided through a wall of the conductor tube.

9. A method of providing an air flow through a ventilation channel within an air-to-air through-wall bushing, the bushing being arranged through a wall and comprising:
- a conductor;
- insulation surrounding the conductor;
- a ventilation inlet at a first end of the bushing; and
- a ventilation outlet at a second end of the bushing;
- the method comprising:
  - providing a pressure difference between a first pressure on a first side of the wall and a second pressure on a second side of the wall; and
  - allowing ambient air to pass through the ventilation channel within the bushing, from the ventilation inlet to the ventilation outlet, driven by the provided pressure difference.

10. A hall arrangement comprising:
- a hall including a wall having a first side with a first pressure and a second side with a second pressure different from the first pressure to provide a pressure difference; and
- an air-to-air through-wall bushing arranged through the wall, the bushing comprising:
  - a conductor;
  - insulation surrounding the conductor;
  - a ventilation inlet at a first end of the bushing;
  - a ventilation outlet at a second end of the bushing; and
  - a ventilation channel extending between the ventilation inlet and the ventilation outlet;
- said ventilation channel configured to allow cooling air to pass into the ventilation inlet, through a ventilation channel within the bushing, and out of the ventilation outlet, driven by the provided pressure difference.

11. The hall arrangement of claim 10, wherein the ventilation channel is formed outside of the conductor.

12. The hall arrangement of claim 11, wherein the ventilation channel is formed in an air-gap between the conductor and a winding tube of the bushing.

13. The hall arrangement of claim 12, wherein the winding tube is concentrically arranged outside of the conductor.

14. The hall arrangement of claim 12, wherein the ventilation inlet and the ventilation outlet are provided through a respective end connection between the winding tube and the conductor at each end of the bushing.

15. The hall arrangement of claim 10, wherein the conductor is in the form of a hollow conductor tube.

16. The hall arrangement of claim 15, wherein the ventilation channel is formed inside of the conductor tube.

17. The hall arrangement of claim 16, wherein the ventilation inlet and the ventilation outlet are provided through a wall of the conductor tube.

18. The hall arrangement of claim 10, wherein the hall is a valve hall.

19. The hall arrangement of claim 10, wherein the hall holds an overpressure which can press cooling air to flow through the ventilation channel from the ventilation inlet arranged within the hall to the ventilation outlet arranged outside of the hall.

20. The hall arrangement of claim 10, wherein the bushing is a high voltage (HV) bushing.

* * * * *